Patented Dec. 5, 1922.

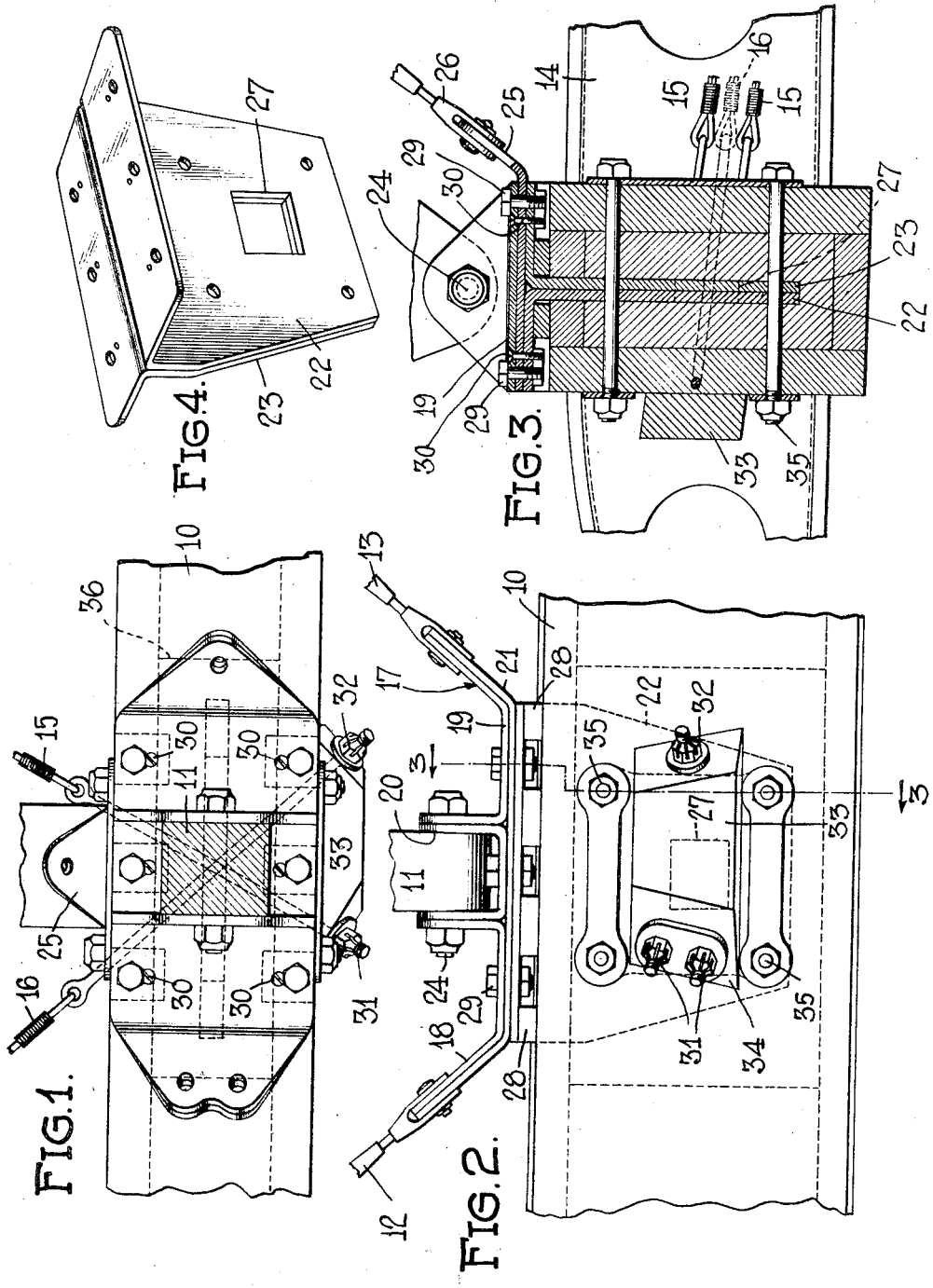

1,437,465

UNITED STATES PATENT OFFICE.

JOHN A. CHRISTEN, OF ROOSEVELT, NEW YORK, ASSIGNOR, BY MESNE ASSIGNMENTS, TO CURTISS AEROPLANE AND MOTOR CORPORATION, OF BUFFALO, NEW YORK, A CORPORATION OF NEW YORK.

AIRPLANE FITTING.

Application filed April 15, 1919. Serial No. 290,238.

*To all whom it may concern:*

Be it known that I, JOHN A. CHRISTEN, a citizen of the United States, residing at Roosevelt, in the county of Nassau and State of New York, have invented certain new and useful Improvements in Airplane Fittings, of which the following is a specification.

My invention relates to airplane fittings and more particularly to a combined brace wire fastening and strut fitting.

Instead of fastening the total number of brace wires (in an airplane wing structure for instance) to anchorages formed upon the wing fittings as heretofore and tightening them by the use of turnbuckles, provision is made for the direct attachment of certain of the brace wires to the beam or beams of the wing and for the tightening of the wires thus fastened without the use of turnbuckles. Among the advantages resulting from the improved arrangement the following may be enumerated: First, the fitting, in view of the decreased number of anchorages required is much simplified; second, material is saved in the construction of the fitting in view of the above and also in view of the fact that the anchorages dispensed with are the ones which are ordinarily distantly removed from the anchorages which are retained; third, the number of turnbuckles, and hence the number of parts utilized in the formation of the truss, is minimized; fourth, it is possible in the construction of the fitting to provide a tongue or fastening without unduly complicating the structure and to carry the tongue deep into the beam preferably to its neutral axis; fifth, by thus constructing the fitting it is possible to carry or extend certain of the brace wires thru the fastening and thru the beam to thus materially strengthen not only the connection between the fitting and the beam but the connection between the brace wire and the beam as well; and sixth, as a result of the foregoing metal is saved with a corresponding reduction in weight.

Another characteristic of the invention is the beam construction in the vicinity of the points of connection of the fitting. For additional strength and for the purpose of providing flat bearing surfaces for the wire anchorages, i. e., the anchorages provided for the brace wires which penetrate the beam or beams, the beam or beams are enlarged and the ends of the enlargement flattened or chamfered. The chamfered ends of the enlargement constitute the bearing surfaces for the wire fastening means. By simply adjusting the fastening means (lock nuts are preferred) the brace wires are tightened or slacked as required. Other advantages and improved results will be pointed out hereinafter.

In the drawings, wherein like characters of reference designate like or corresponding parts:

Fig. 1 is a plan view of the fitting, the strut connecting therewith being shown in section;

Fig. 2 is a side elevation of the structure illustrated in Fig. 1;

Fig. 3 is a section on the line 3—3 of Fig. 2; and

Fig. 4 is a perspective view of the angle plate of the fitting.

In the embodiment of the invention selected for illustration the fitting is shown as forming a part of an airplane wing structure, although it is not intended that its use should be thus limited, for it is obvious, as pointed out in the claims hereinafter, that the fitting may be used with equally good results in connection with any trussed structure including a beam, a strut connecting therewith and brace wires extending off from the beam at an angle. For instance, the fitting may be used in the construction of an airplane fuselage in which event the longeron of the fuselage is the equivalent of the beam herein shown, the fuselage strut the equivalent of the wing post or strut herein shown and the fuselage wiring the equivalent of the lift and drop wires illustrated. I shall however describe the fitting as applicable in the instance first mentioned.

In an airplane wing structure it is customary to provide a wing beam, a wing post or wing strut, a lift wire, a drop wire, a compression member, and internal wiring consisting of drift and anti-drift brace wires or stays. These parts are herein illustrated and respectively designated as 10, 11, 12, 13, 14, 15, and 16. Ordinarily all of the wires enumerated connect with the fittings provided at the strut points in the wing. In the present invention this more or less conventional practise is only followed out in part since the drift and anti-drift wires 15 and 16 of the wing structure do not directly connect with the fittings but may be more properly said to directly connect with the beam 10 of the wing. The advantages resulting from this departure from the conventional practise has been hereinbefore explained. The advantage resulting from simplicity and design and the saving of metal and weight in the construction of the airplane fitting should however, be emphasized. It is unnecessary in the arrangement herein disclosed to carry the fitting around the beam to provide special fittings for the wires 15 and 16 which are enclosed within the confines of the wing.

The improved fitting, designated as an entirety by the numeral 17 is made up in six parts, the parts being designated respectively 18, 19, 20, 21, 22 and 23. Each part may be stamped out of sheet metal and the fitting when completed is characterized by an absence of brazing or welding in the connection of the fitting parts. The parts 18 and 19 are of identical construction and in the assembly of the fitting are opposed, the ends of the parts 18 and 19 extending off from the intermediate portions thereof at an angle. The ends of the parts 18 and 19 which are adjacent (when the fitting is assembled) extend off from the intermediate portions thereof at a right angle, whereas the remote or opposite ends of the mentioned parts extend off from the intermediate portions at approximately a 45 degree angle. Between the right angle extensions of the parts 18 and 19 the part 20 of the fitting is disposed. Viewed from the side or rather edgewise the part 20 is U-shaped. The legs or extensions of the U-shaped part form with the right angle extensions of the parts 18 and 19, socket ears between which the strut end is seated. 24 indicates a bolt for fastening the strut end between the socket ears. The part 21 of the fitting is of a construction somewhat similar to the parts 18 and 19 combined except that intermediately it is extended across and beneath the strut end and is devoid of socket ears. At its ends or extremities however, it is extended off from the beam 10 at a 45 degree angle to correspond with the end construction of the mentioned duplicate parts. In fact the angular extremities of the parts 18 and 21 on the one hand and the parts 19 and 21 on the other together constitute anchorages or ears for the attachment of the wires 12 and 13 respectively of the wing structure truss. It will be noted therefore, that in each instance a double thickness of metal is provided. For the attachment of the stagger wires the part 20 of the fitting may be provided with an integral ear 25. The stagger wire illustrated is designated as 26. In addition to the parts 18 and 19 of the fitting, which are constructed in duplicate, the fitting comprises the parts 22 and 23, which are likewise of duplicate construction. These parts are each of a right angle formation (see Fig. 4) to provide when placed side by side a substantially T-shaped fastening member for the remaining parts of the fitting. The stem portion of the T-shaped fastening is carried deep into the beam and is centrally provided with an aperture 27 thru which the brace wires 15 and 16 extend. The head portion of the fastening member is however, carried without the beam and underlies the fitting part 21. Preferably it is blocked up slightly as indicated at 28 for the purpose of conveniently fastening the fitting parts together. The fastening means comprises bolts 29 which are carried thru the parts 18, 21 and 22; 19, 21 and 22; 20, 21 and 22; 18, 21 and 23; 19, 21 and 23; and 20, 21 and 23; respectively. Being thus fastened together there is little if any possibility of the fitting parts pulling apart. As a locking means for the fastenings 29 screws 30 may be provided. In the attachment of the wires 15 and 16 of the wing parts, anchorages similar to the ones above mentioned, are not required. Instead of directly attaching the wires 15 and 16 to the fitting 17 the wires are extended thru the beam 10 and thru the opening (as stated) 27 formed in the tongue or stem of the T-shaped portion of the fitting. Preferably the wires 15 and 16 comprise connected wire sections for in the attachment of the wires it is essential that the sections which are carried thru the beam should be terminally threaded as indicated at 31. By thus extending the wires thru the beams and providing them with threaded terminals it is obvious that the wires may be directly fastened without the use of turnbuckles or their equivalent. Both adjustment in the effective wire length and the fastening of the wires are obtained thru the medium of nuts 32 carried upon the threaded ends of the wires. The nuts, after adjustment, are locked.

The means for reenforcing the beam in the vicinity of the points of penetration of the wires comprises an enlargement 33 formed upon the outside or far side of the beam. Said enlargement has its ends chamfered as indicated at 34 to provide relatively flat bearing surfaces for the wire fastening means. The ends of the enlargement are chamfered since it is necessary in the formation of the wing truss to extend the wires 15 and 16 away from the beam at an angle.

In extending the tongue or stem of the T-shaped member of the fitting into the beam, it is desirable that it be carried deep thereinto, at least to its neutral axis. This is desirable for structural reasons and for the further reason that in the arrangement of the wires 15 and 16, it is preferred that they penetrate the beam at points along or as near its neutral axis as is practical. In the drawings two drift and one anti-drift wires are disclosed, hence it is impractical to carry all three of the wires thru the beam at points along its neutral axis since the wires cross. I therefore carry the anti-drift wire thru the beam at the point mentioned and space the two drift wires respectively slightly above and slightly below said axis.

The means for fastening the tongue of the fitting to the beam comprises bolts 35 (preferably four in number). These bolts penetrate the tongue and also the beam and in addition provide a fastening means for a special fitting designed to receive the end of the compression member 14 connecting with the wing beam 10.

In providing shoulders or flat bearing surfaces for the fastening means 32, it is not essential that the beam be enlarged as indicated. An enlargement is preferred in a beam of the character disclosed, the beam being of the box-beam type and reenforced as indicated at 36 at the strut points. If an I-beam is used in place of the box-beam illustrated then only the web portion of the beam need be enlarged, or, if the beam is rectangular in cross section it may be recessed and angular shoulders provided for the wire fastening means. This latter expedient, however, is more or less objectionable since the formation of the recess in the beam tends to weaken it, whereas enlargements formed thereon have a tendency toward added strength.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. In an airplane, the combination of a beam, a strut connecting with the beam, a fitting for the strut end arranged to bear against one face of the beam, said fitting being provided with an angular extension, and a brace wire extended thru the beam and thru the extension formed on the fitting.

2. In an airplane, the combination of a beam, a strut connecting with the beam, a fitting for the strut end carried by and extended into the beam, a brace wire extended thru the beam and the extended portion of the fitting, and means adjustable upon the end of the brace wire to tighten it.

3. In an airplane, the combination of a beam, a strut connecting with the beam, a fitting for the strut, the fitting including an angle plate having an extension thereof carried deep into the beam, a brace wire extended thru the beam and the extension of the fitting, and means adjustable upon the end of the brace wire to tighten it.

4. In an airplane, the combination of a beam, a strut connecting with the beam, an angle plate having an extension carried deep into the beam, a plate provided with upstanding ears between which the strut end is seated and means extending thru the beam and the extended portion of the angle plate for fastening the beam and angle plate together.

5. In an airplane, the combination of a beam, brace wires connecting with the beam, an angle plate having an extension carried deep into the beam, a plate provided with ears for the attachment of the brace wires, means for fastening the plates together, and means extending thru the beam and the extended portion of the angle plate for fastening the beam and angle plate together.

6. In an airplane, the combination of a beam, a strut connecting with the beam, brace wires likewise connecting with the beam, a fitting, ears formed upon the fitting for the attachment of the brace wires, ears formed upon the fittings for the anchorage of the strut, an extension formed upon the fitting, the extension being carried deep into the beam and means extending thru the extension of the fitting and the beam for the attachment of the fitting.

7. In an airplane, the combination of a beam, a strut connecting with the beam, a fitting for the strut end carried by and extended into the beam, and fastening means for the fitting extended transversely through the beam.

8. In an airplane, the combination of a beam, a strut connecting with the beam, and a fitting for the strut end including a body plate adapted to bear against one face of the beam, one face of the body plate being provided with an angular intermediate extension for the attachment of the strut end and its opposite face with an angular intermediate extension for the attachment of the fitting, said last mentioned extension being provided with an opening thru which a brace element of the airplane extends.

In testimony whereof I hereunto affix my signature.

JOHN A. CHRISTEN.